United States Patent
Ishii et al.

(10) Patent No.: US 10,386,563 B2
(45) Date of Patent: Aug. 20, 2019

(54) ILLUMINATOR FOR A WEARABLE DISPLAY

(71) Applicants: Fusao Ishii, Pittsburgh, PA (US); Yuji Aburakawa, Tokyo (JP); Kazuhiko Takahashi, Tokyo (JP); Keiichi Murakami, Tokyo (JP); Mikiko Nakanishi, Kanagawa (JP)

(72) Inventors: Fusao Ishii, Pittsburgh, PA (US); Yuji Aburakawa, Tokyo (JP); Kazuhiko Takahashi, Tokyo (JP); Keiichi Murakami, Tokyo (JP); Mikiko Nakanishi, Kanagawa (JP)

(73) Assignees: Fusao Ishii, Pittsburgh, PA (US); NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 15/650,889

(22) Filed: Jul. 15, 2017

(65) Prior Publication Data
US 2018/0372940 A1   Dec. 27, 2018

(51) Int. Cl.
*G02B 27/14* (2006.01)
*G09G 5/00* (2006.01)
*F21V 8/00* (2006.01)
*G02B 27/01* (2006.01)
*G02B 27/09* (2006.01)
*G02B 27/28* (2006.01)
*G02B 27/48* (2006.01)
*G02B 5/30* (2006.01)

(52) U.S. Cl.
CPC ....... *G02B 6/0031* (2013.01); *G02B 27/0172* (2013.01); *G02B 27/0905* (2013.01); *G02B 27/0961* (2013.01); *G02B 27/141* (2013.01); *G02B 27/283* (2013.01); *G02B 5/30* (2013.01); *G02B 27/48* (2013.01); *G02B 2027/011* (2013.01); *G02B 2027/012* (2013.01); *G02B 2027/0123* (2013.01); *G02B 2027/0138* (2013.01); *G02B 2027/0174* (2013.01); *G02B 2027/0178* (2013.01)

(58) Field of Classification Search
CPC .... G02B 2027/0174; G02B 2027/0178; G02B 27/01; G02B 27/0101; G02B 27/0103; G02B 27/017; G02B 27/0172
USPC .......................................... 359/630; 345/7–9
See application file for complete search history.

(56) References Cited

U.S. PATENT DOCUMENTS

| | | | |
|---|---|---|---|
| 2010/0007860 A1* | 1/2010 | Ueda ................. | G02B 27/1046 353/81 |
| 2014/0118829 A1* | 5/2014 | Ma ...................... | G02B 5/1885 359/567 |
| 2016/0011419 A1* | 1/2016 | Gao .................... | G02B 27/0172 359/471 |
| 2016/0097930 A1* | 4/2016 | Robbins ............. | G02B 27/0172 345/8 |

* cited by examiner

*Primary Examiner* — William Choi
(74) *Attorney, Agent, or Firm* — Bo-In Lin

(57) ABSTRACT

A compact illuminator for a see-through image display system with highly uniform light distribution is disclosed. This invention enables wearable displays such as eye-glass type see-through display. This system provides a wide divergent beam from a display device so that a viewer can have a large eyebox.

8 Claims, 12 Drawing Sheets

ILLUMINATOR FOR A WEARABLE DISPLAY

CROSS REFERENCE TO RELATED APPLICATIONS

This application is a Non-Provisional Application that claims the benefits of a previously filed Provisional Application 62/493,077 filed on Jun. 21, 2016. This Application is also a Continuation in Part (CIP) of Patent Application PCT/US2014/000153 filed on Jun. 23, 2014, which is a Non-Provisional Application of a Provisional Application 61/957,258 filed on Jun. 27, 2013.

TECHNICAL FIELD

This invention relates to an illumination system for a wearable display system for projecting an image to a diffractive optical element enabling a see-through display with high resolution and wide field of view. More particularly, this invention relates to a very compact illuminator suitable for wearable displays with very small form factor.

BACKGROUND ART

Wearable displays have received broad attention in recent years after smart phones became popular and are well accepted by the market. Wearable displays provide the benefits of hands free operation as well as showing the images to the person who wears the display at a distance same as regular sight. Because of these advantages, there are tremendous needs for wearable displays. However, the conventional near eye displays such as Head Mount Display, Head up Display and Eye Glass Type Display have not provided satisfied wearable display solutions to the viewers, because these conventional devices are often too heavy, too large, and too dark. Furthermore, these conventional wearable displays often have low resolution and many of them do not provide a see-through view and are mostly expensive and can only display small size of images. Therefore, there are urgent needs for providing wearable display devices that are light, small, bright, having high resolution with see-through viewing optical path. It is further desirable that the new wearable devices are inexpensive that can display large image and can be putted on in a stealthy manner without being detected by others that the person is wearing such a wearable device. Display systems implemented with LED and Laser light sources usually have a technical problem with uneven distribution of light intensity and a homogenizer is typically required for the display systems to provide uniform brightness of image. Three separate color light sources require to combine into a single light beam before projecting onto a display device. Enabling a compact eye-glass type display requires a very small system having both homogenizer and combiner. Several systems are proposed in the past.

As shown in FIG. 1, Takeda et al. disclosed in U.S. Pat. No. 8,711,487 an eye glass type display system that implements see-through capability with a wave guide and a half-mirror. This system incorporates a transmissive LCD as a display and the illumination system is a backlight light-guide that diffuses the light from the light source. This system is suitable for transmissive LCD, but not necessarily suitable for other display devices such as LCOS and DMD.

As shown in FIG. 2 and FIG. 2A, Takahashi et al. disclosed in US Patent Application Publication US2013/0021581 an illuminator and a display for miniaturization. The system comprises multi-color light sources such as LED and Laser (11) with micro-lenses (116) to collimate, dichroic mirrors (117) to combine light beams as shown in FIG. 2A and a polarized beam splitter (PBS, 16) arranged in perpendicular direction from LCOS (17). If this is used for an eye-glass display and embedded in a temple of glasses, this illuminator will stick out of the temple of glasses.

As shown in FIG. 3, Katsumata et al. disclosed in JP2013-195603 a Planar Lightwave Circuit (PLC). A beam from a laser diode is lead into a light-wave guide and the light energy in a light-wave can be transferred to an adjacent light-wave guide in a certain condition. This method is suitable for a combiner of laser light sources and has a great potential, although it requires further study prior to high volume commercialization.

This invention presents a practical solutions of an illuminator applicable to eye-glass display

SUMMARY OF THE INVENTION

One of the objectives of this invention is to provide a compact illuminator for a see-through near eye display whose field of view is nearly full size of eyeglass, although an illuminator, the optics and the electronics of the system are very compact and can be embedded in the temple of eyeglass, such as the glasses in FIG. 4 and FIG. 5. A display device such as LCOS, LCD or DMD, is used to project an image toward a lens of eyeglass from its temple. Because of the geometrical configuration of eyeglass and human eye, an image is projected from the temple of eyeglass to its eye-lens and reflected to a human eye. A virtual image is created in air without any physical screen. A physical screen reflects projected light in large divergent angle and a viewer can see an image in a large viewing angle. But in case of see-through displays such as eyeglass displays and head-up displays, there is no physical screen exists and an image can be seen only in so called "Eyebox" wherein a viewer can see an image and often tends to be very small. The eyebox of see-through display has to be large enough for a viewer to see an image comfortably with some movement of eyeglass display with respect to eyes. This requires a special design of illuminator to ensure the size of eyebox. The size of eyebox is closely related to the divergent angle of light beams from a display device. For conventional projection display, the divergent angle of light beams from a display device was kept as small as possible for high resolution and sharp images. But a see-through display requires a large divergent angle of light beams from a display device as well as high resolution virtual images. An illuminator has to provide a converging light with a large angle to the surface of display device. This can be achieved with a configuration shown in FIG. 7 as an example wherein an expander lens (1006) expands an incoming light beam to a collimation lens (1007) and the beam becomes substantially parallel and enters a first micro-lens-array (1008) and creates an image of light source on a second micro-lens-array (1009), in other words the image on the second micro-lens-array is conjugate to the light source. The image on the second micro-lens-array is projected by a condenser lens (1010) to a display device (1013) as a conjugate image of the first micro-lens-array. The diameter of illumination light at the condenser lens and the distance between the condenser lens and the display device determines the convergent angle of light source to the display device. This is how to ensure a large eyebox with an illuminator.

Another example of this invention is to reduce the size of illuminator using additional ¼ λ retarder which rotates the angle of polarization of light by 90 degrees placed on the opposite face to a display device as shown in FIG. 10. This configuration reduces the distance between a condenser lens and a display device which helps to increase the incoming light angle. Combined with a homogenizer, an example is shown at FIG. 11.

Another aspect of this invention is to provide light combiners suitable for see-through display with a small form factor. Solids state light sources such as laser and LED packaged in a cell with a lens-array (2002) as in FIG. 8 or with DOE (diffractive optical element 7002) as in FIG. 9.

DETAIL DESCRIPTIONS OF THE PREFERRED EMBODIMENTS

The detail descriptions of various embodiments below illustrate various illuminators to provide light beams to display device of a see-though display system having wide angle (large NA) enough to ensure a large eyebox for a viewer.

Figure 6:
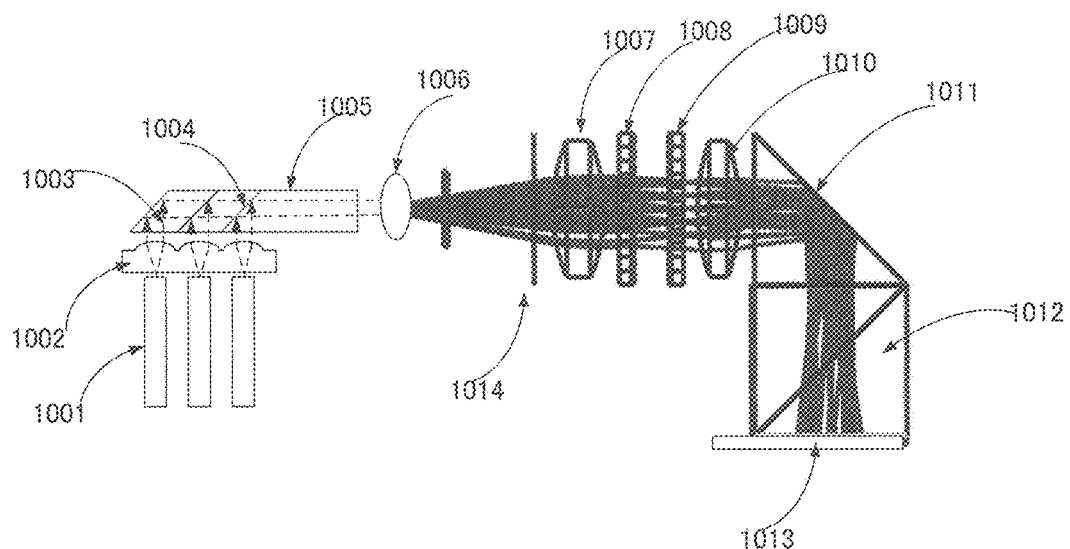
FIG. 6 shows an example of this invention where chips of laser diodes are directly packaged with a collimation lens-array and dichroic mirrors combine light beam to an expander lens.
Figure 7:
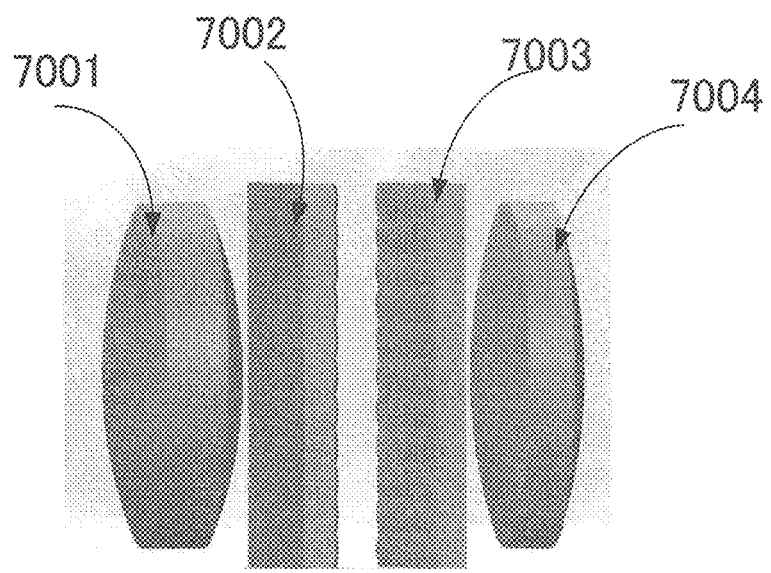
FIG. 7 shows an example of homogenizer using two lenses and two micro-lens-arrays. 7001 is a collimation lens, 7002 is a first Fly-eye lens (this is also called as micro-lens-array). 7003 is a second Fly-eye lens. 7004 is a field lens.

FIG. 6 and FIG. 7 show an exemplary embodiment of this invention wherein a micro-lens-array (1002) collimates multiple light sources (1001) to a set of dichroic mirrors (1005) to combine light beams into a single beam. The single beam is expanded by an expander lens (1006) and lead to a collimation lens (1007). The collimated beam is divided into multiple beams by a second micro-lens-array (1008) and focused on a third micro-lens-array (1009) where the image is conjugate with the light source. A condenser lens (1010) is placed next to the third micro-lens-array (1009) and light beams are passed to a prism (1011) and reflected toward a polarized beam splitter PBS (1012) by the prism (1011). The reflected light is focused on the display device (1013) to display the image with each pixel corresponding to each micro-lens of the third micro-lens-array projected on an entire area of the display device (1013) wherein the third micro-lens-array and the display device are optically conjugate.

Figure 1:
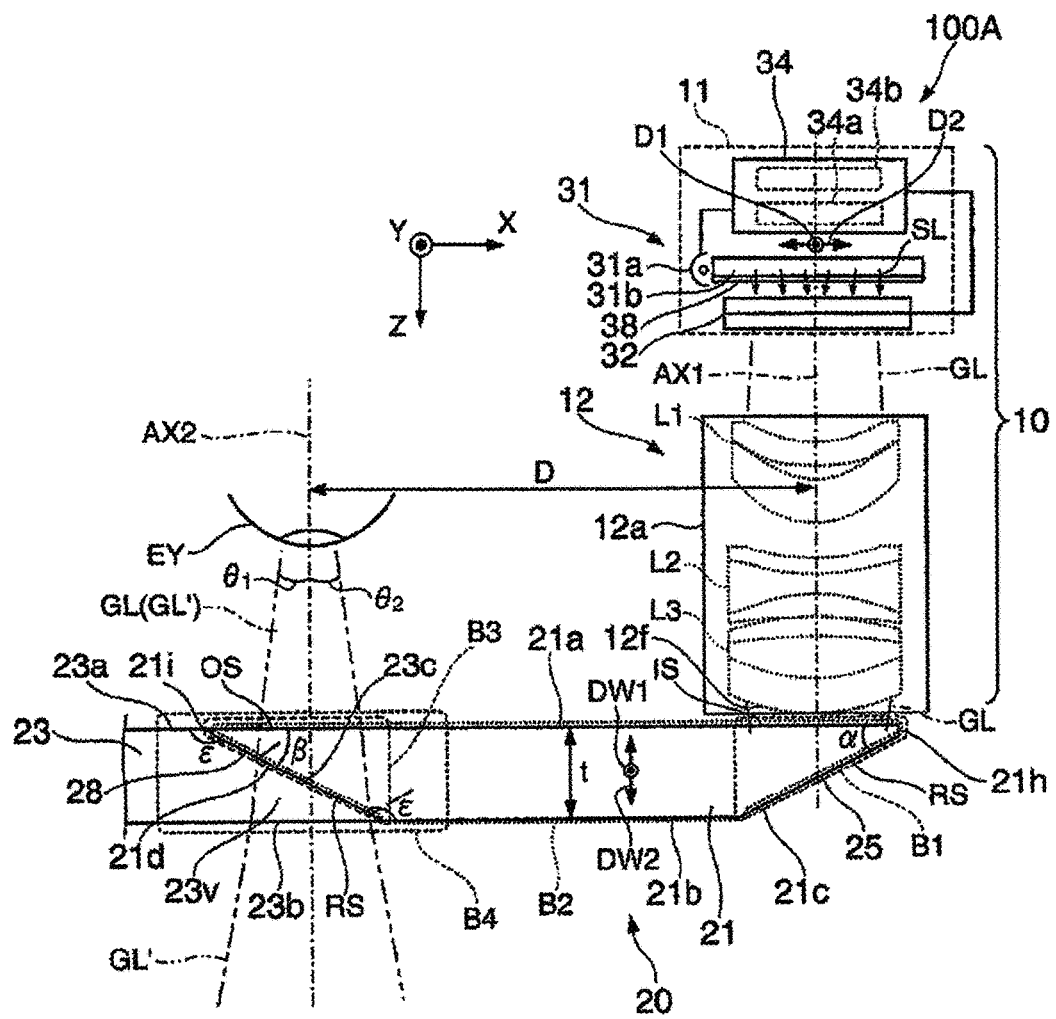
FIG. 1 is a structure of see-through display shown by Takeda et al. disclosed in U.S. Pat. No. 8,711,487. As an illuminator for a LCD display panel, a backlight module was used.
Figure 2:
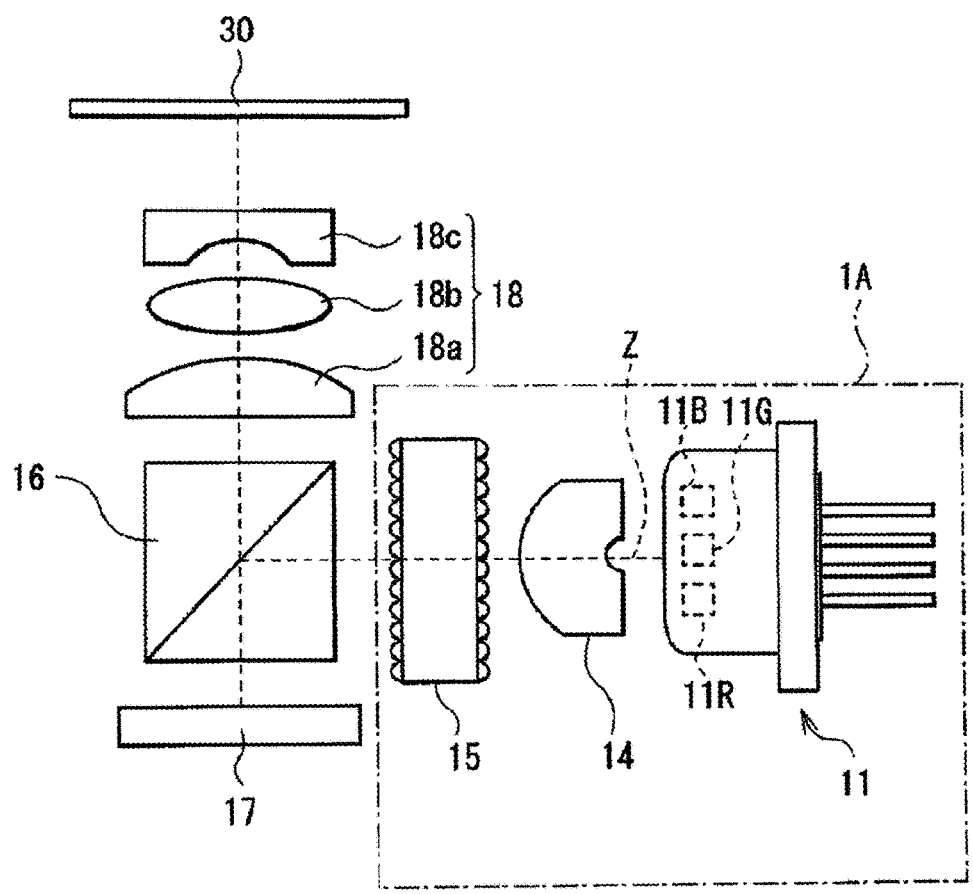
FIG. 2 and FIG. 2A are shown by Takahashi et al. in US Patent Application Publication US2013/0021581, wherein an expander lens and a micro-lens are used to provide light to a PBS.
Figure 2A:
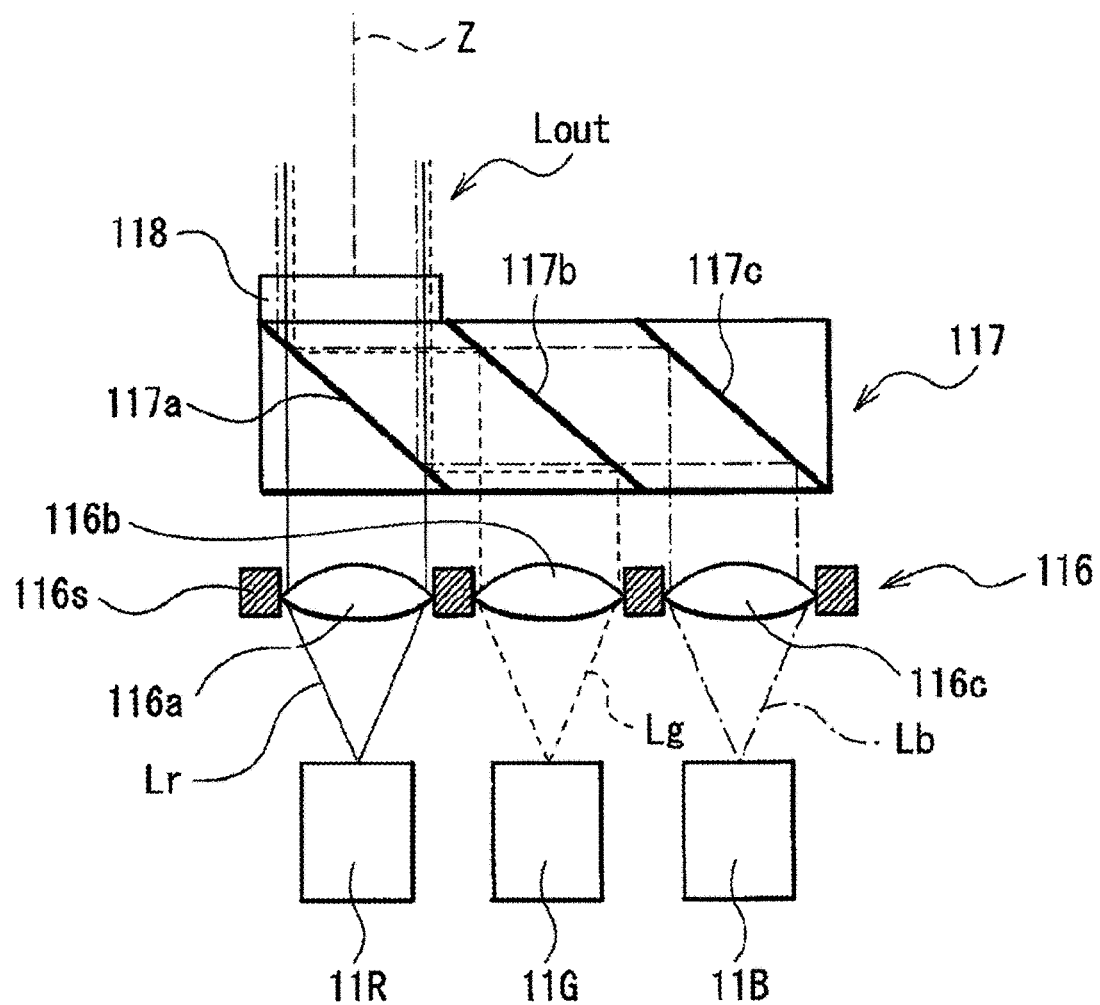
Figure 3:
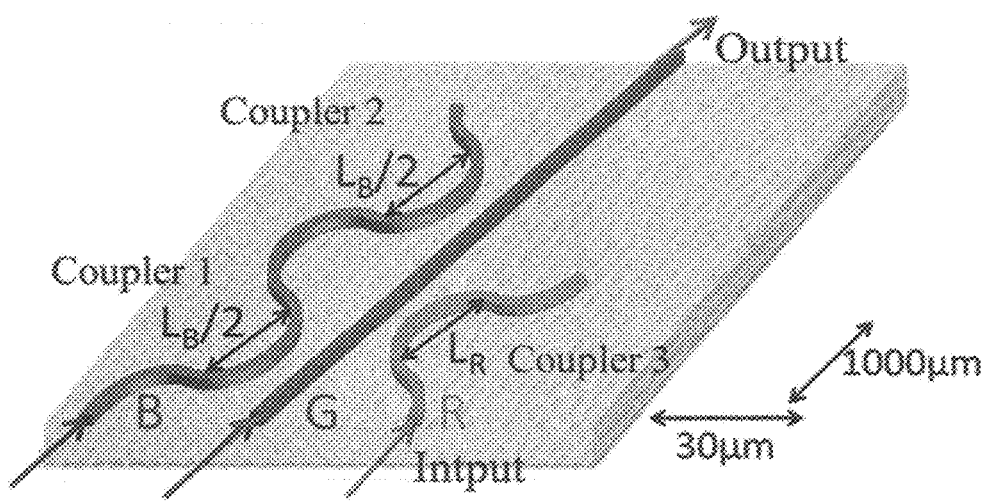
FIG. 3 is disclosed by Katsumata et al. disclosed in JP2013-195603, a Planar Lightwave Circuit (PLC). A beam from a laser diode is lead into a light-wave guide and the light energy in a light-wave can be transferred to an adjacent light-wave guide in a certain condition. This is another way to combine multiple light beams into one.
Figure 4:
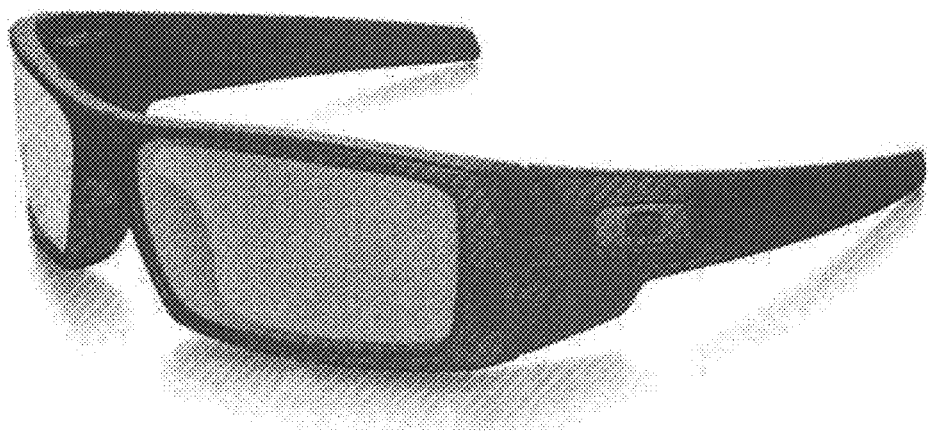
FIG. 4 and FIG. 5 are examples of eyeglasses which are capable to embed optical and display systems in a temple.
Figure 5:
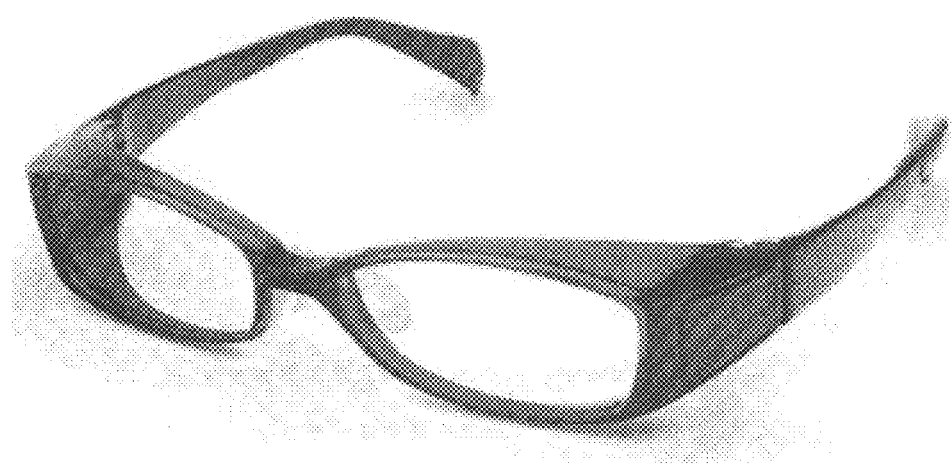
Figure 8:
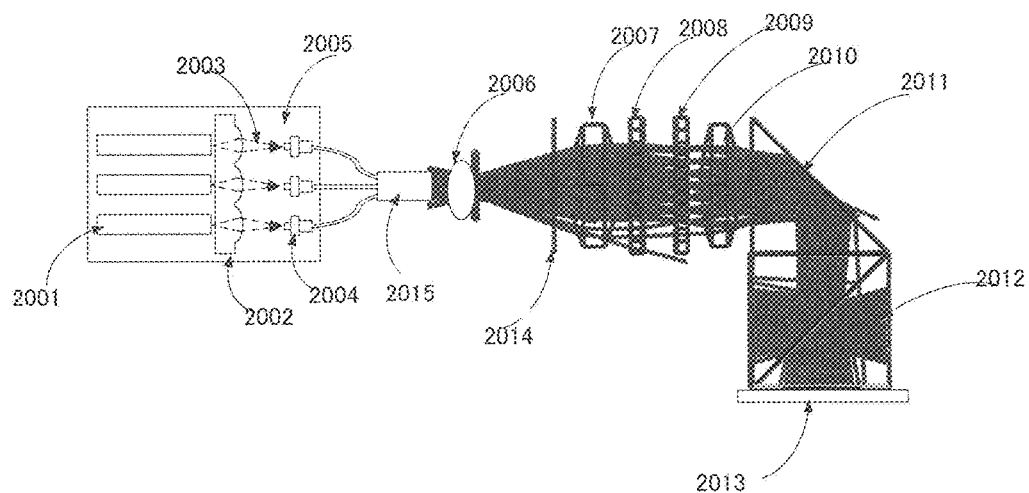
FIG. 8 shows an example of this invention where optical fibers are used to combine laser beams and lead into a homogenizer.

FIG. 8 shows another embodiment of this invention wherein a micro-lens-array (2002) is implemented to combine the light beams projected from multiple light sources (2001) into a light to project into a light guide (2004) functioning as a light pipe and then transmitted through optical fibers with a PLC planar light-wave circuit, 2006 in FIG. 8 and a unit in FIG. 3. FIG. 8 further shows a light source unit 2005 and a collimated or condensed light beam 2003. The combined light is expanded by an expander lens (2006) to a collimation lens (2007). The collimated light is then transmitted through the optical components that are the same as shown in FIG. 6

Figure 9:
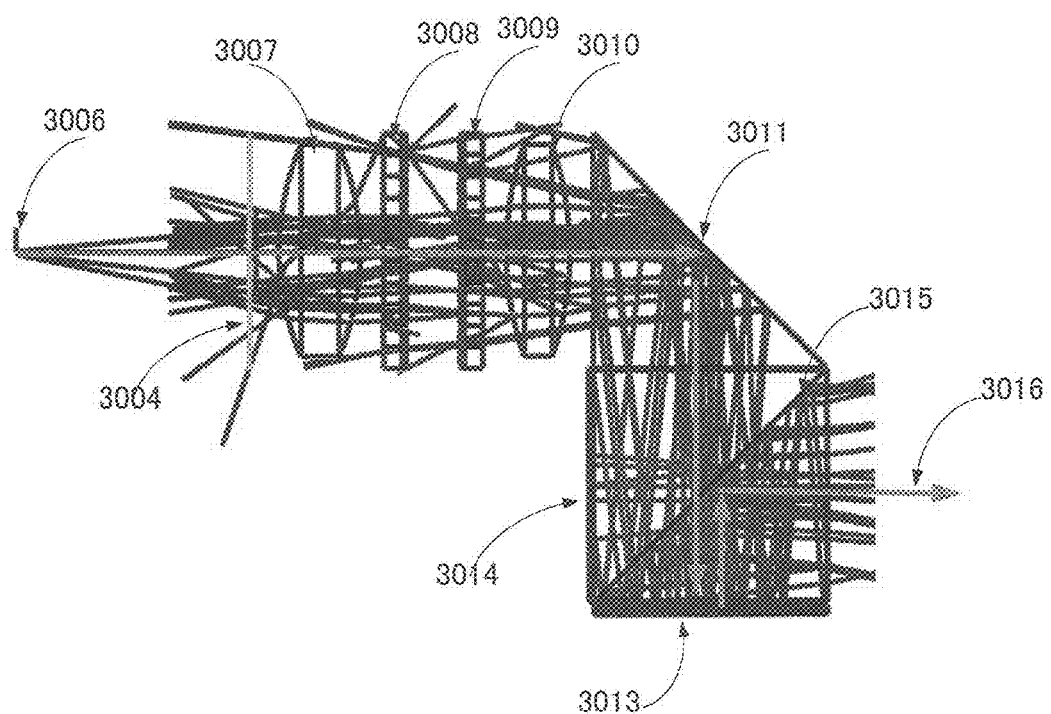
FIG. 9 illustrates how light beams propagate in the components of illuminator.

FIG. 9 illustrates the optical paths in more details for the light beams shown in FIG. 6 and FIG. 8. A combined light beam (3006) comprises lights of multiple wavelengths is emitted from the edge of optical fiber or a laser diode/LED with a diverging angle. The light source (3006) and the second micro-lens-array (3009) are optically conjugate and the first micro-lens-array (3008) and a display device (3013) are also optically conjugate. The incident light passes through the homogenizer (3007 to 3010) and reflected by a prism (3011) to a polarizer (3015) which reflects S-wave to a light absorber (3014) and passes P-wave to a display device (3013). The display device reflects light with rotation of polarization for a bright image from P-wave to S-wave and the S-wave will be reflected by the polarizer (3016) toward a projection lens in the direction (3016).

Figure 10:
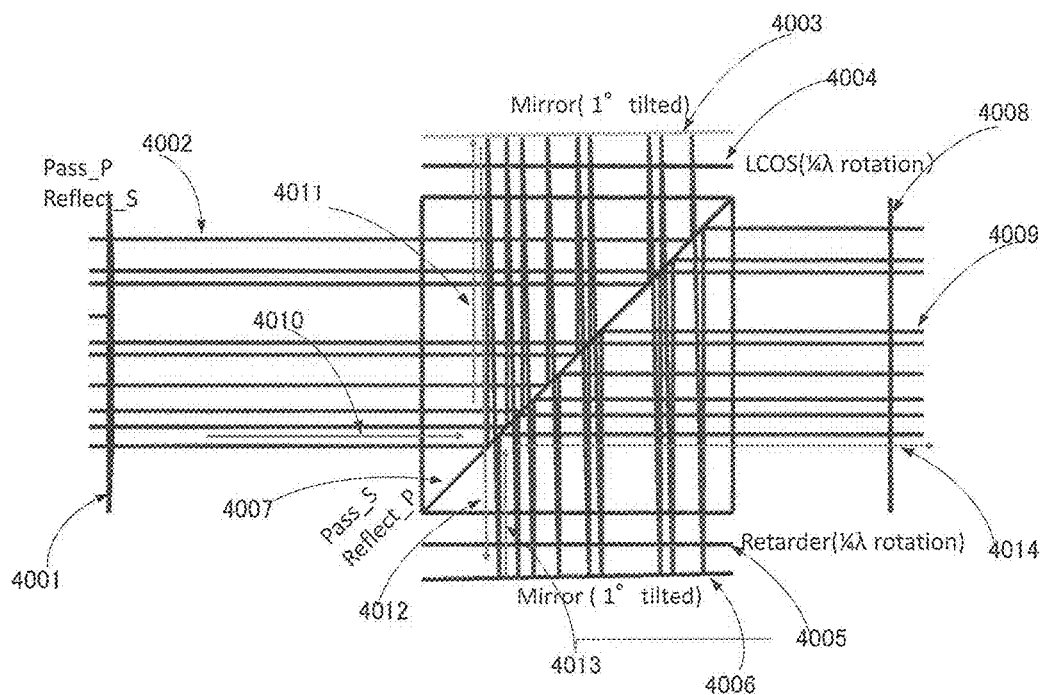
FIG. 10 illustrates how light passes in a PBS combined with a ¼ λ retarder to reduce the size of illuminator.

FIG. 10 shows an example of embodiments of this invention. Incoming light passes through a polarizer plate (4001) which passes only P-wave and reflects or absorbs S-wave. The light passing the polarizer (4002) enters a Polarized Beam Splitter (PBS, 4011) and hits a polarizer surface (4007, which passes only S-wave and reflects P-wave). Because the light (4002) contains only P-wave, it will be reflected by PBS (4007) toward a LCOS (4004) and the LCOS changes the polarization of the incoming light depending of image signal and reflects S-wave at bright images toward the PBS. The S-wave will pass the PBS and passes a retarder with ¼ lambda (wave-length) rotation of polarization and will be reflected by a mirror (4006) and passes the ¼ lambda retarder at the second time which changes the polarization of light by ½ lambda and the incoming light becomes P-wave and will be reflected by the PBS (4007) toward the exit (4008) of this illuminator. The advantage of this system is incoming light (4002) and the outgoing light (4009) are in line, which saves the space of illuminator rather than the previous example shown in FIG.

9 wherein the incoming light (3006) and the outgoing light (3016) are in a different level which requires more space of illuminator.

Figure 11:
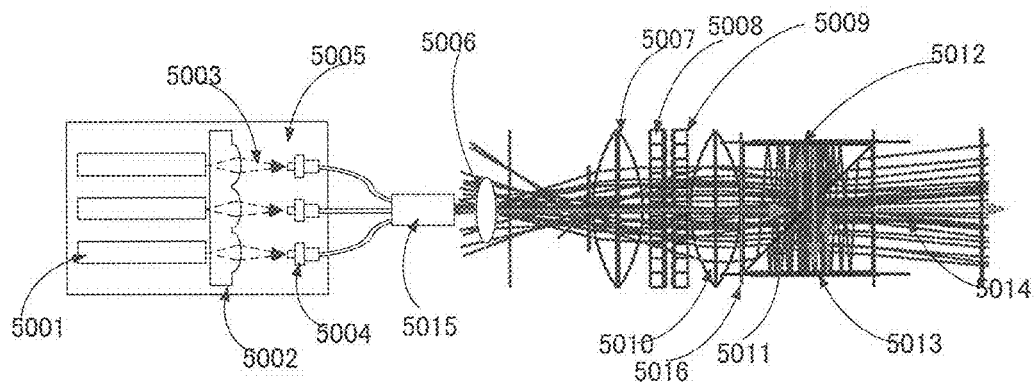
FIG. 11 illustrates the structure of a reduced size illuminator.

FIG. 11 shows anther embodiment of this invention wherein the laser diodes (5001) are packaged in a cell and a micro-lens-array (5002) focuses multiple beams having multiple wavelengths form the laser diodes to optical fibers and a PLC (5015, planar light-wave circuit) (5003, 5004, 5005 are not described) combines the multiple beams into a single beam. An expander lens (5006) expands the light beam toward a homogenizer (5007 to 5010). P-wave of the light after the homogenizer will pass a polarizer (5016) and the residual light containing S-wave is reflected back to the homogenizer. The P-wave light is reflected by a polarizer (5011, Pass-P and Reflect-S type) toward a display device (5012). The display device reflects S-wave light for an image to the polarizer (5011) and it will pass to a ¼ λ retarder (5013) and a mirror (5013). The retarder rotates the polarization of image light by ¼ λ and the light is reflected by the mirror (5013) and the light is transmitted through the retarder 5013 wherein retarder 5013 functions similarly as both a retarder 4005 and a mirror 4006). Again with additional ¼ λ rotation of polarization, the beam is ended up with ½ λ rotation. The incoming S-wave is converted to P-wave by the retarder and mirror and reflected by the polarizer toward an exit of illuminator (5014 or we may need a new number as 4008). This system has ½ distance between the homogenizer and the display device compared with the previous example, which provides a larger NA of converging light to the display device. This display system improves the size of eye box of image even with the back-focus of the system twice longer than the size of PBS because of duplicated light paths of reflected light through the optical components in the display device.

Figure 12:
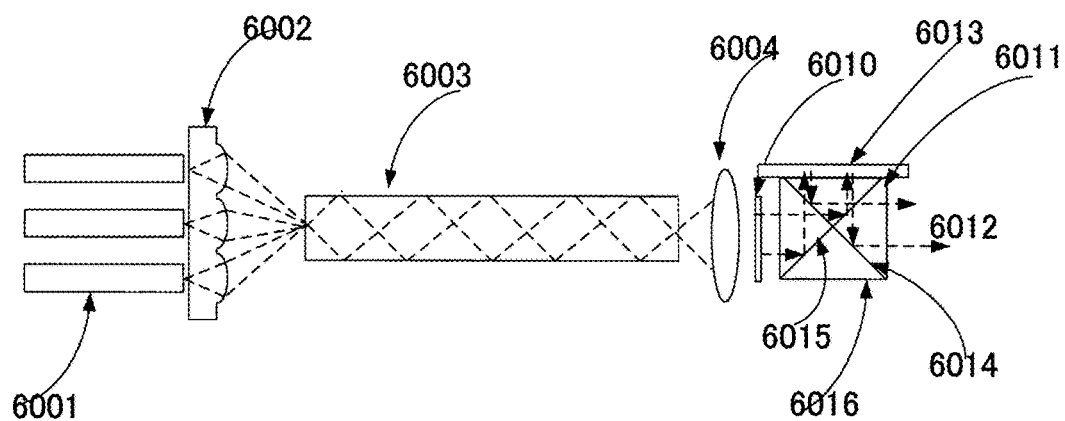
FIG. 12 illustrates an example of this invention which uses micro-lens-array to combine multiple light beams into a light guide (light pipe or optical fiber) and lead to a homogenizer and a PBS.
Figure 12A:
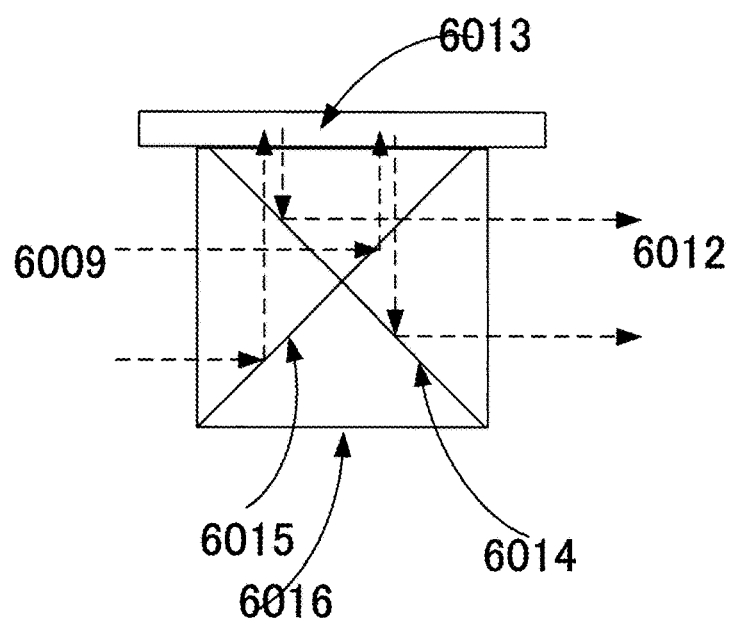
FIG. 12A illustrates how light beams pass in the component.

FIG. 11 shows another embodiment of this invention wherein the light sources such as Laser diodes and LEDs (6001) are packaged with a micro-lens-array (6002) to focus light beams from the light sources to an entrance of a light pipe (6003) which homogenizes the distribution of light intensity. The image at the exit of the light pipe is to be projected to a display device (6013). Therefore, the light beams at the exit of the light pipe and the light beams projected onto the display device 6013 are optically conjugate. A polarizer (6010) is placed between the light pipe and a cross PBS (6011) (polarized beam splitter). The cross PBS (6011) comprises four triangular prisms with polarizing surface coating with different types (P or S) of polarization in two diagonal directions (6014 and 6015). As that shown in FIG. 12, the incoming light beams (6009) are polarized to P-wave by the polarizer (6010) and reflected by a polarizer embedded in the PBS (6011) to the display device (6013). The beams reflected by the display device containing image light having S-wave will be reflected toward a projection lens along a direction (6012) and the residual light having P-wave will pass through the polarizer to an absorber (6016).

Figure 13:
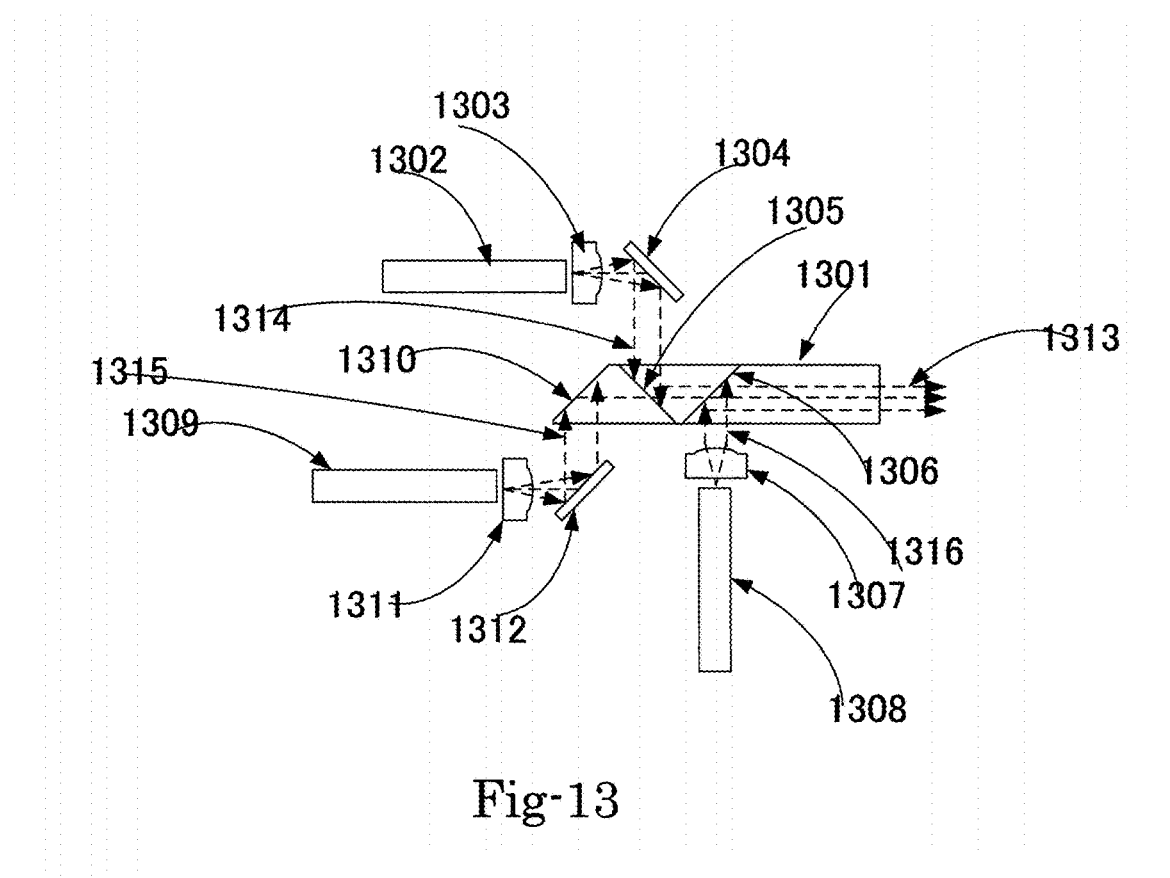
FIG. 13 illustrates an example of this invention which uses a DOE array to combine light beams into a light pipe and a PBS.

FIG. 13 shows an example of embodiment. It is often neither economical nor practical to use all three color LEDs or Lasers because Green is not efficient technically as well as economically and the conversion of wavelength by phosphor is very useful. 1308 is a blue laser or LED and is used without wavelength conversion, because blue is most efficient. 1307 is a collimation lens and 131 is a collimated blue beam and reflected by a dichroic mirror (1306) to an output beam (1313). As also shown in the Figure, 1308 is a blue laser or LED and 1311 is a collimation lens. 1312 is a green phosphor plate which converts blue light to green light (1315) and reflect toward a mirror (1310). 1302 is another blue laser or LED and 1303 is a collimation lens and 1304 is a red phosphor plate which converts blue light to red light (1314).

Figure 14:
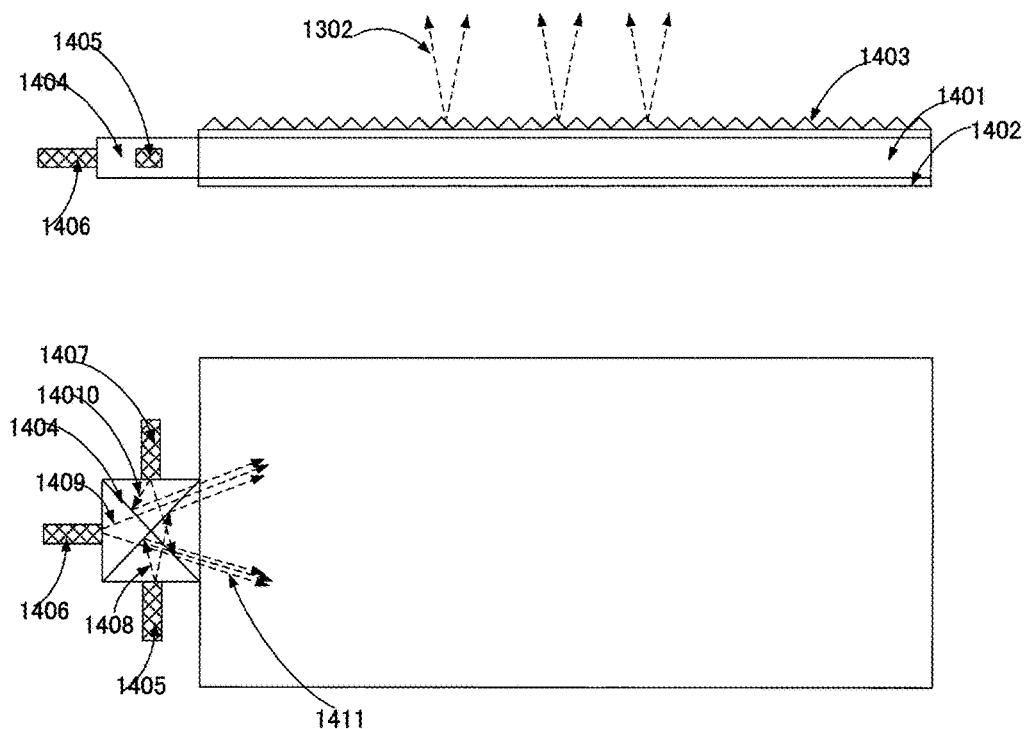
FIG. 14 illustrates another exemplary embodiment of a see-through display with which an illuminator is combined.

FIG. 14 shows another example of embodiments. Three different color light sources (1405, 1406 and 1407) are arranged and integrated into one beam (1411) and lead into the optical guide (1401). The light beams (1411) in the optical guide are reflected by the reflector (1402) and the diffuser (1403) multiple times and emitted (1302) toward substantially normal direction to the diffuser (1403). This example provides homogenized light distribution from the diffuser surface (1403).

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A see-through display system comprising:
   a display device comprising a LCOS with a circuit to drive the LCOS;
   an eyeglass lens and a temple;
   a see-through optical element comprises a group of holographic optical element (HOE) and diffractive optical element (DOE) attached to the eyeglass lens;
   a projection optics embedded in the temple having at least one lens with at least one free form surface and at least one mirror projecting image light beams through air to the eyeglass;
   an illuminator comprising a light source of multiple colors having light emitting device(s) from a group of Laser, LED, OLED and phosphor activated by a solid state light source;
   an optical combiner combining the light sources of multiple colors into a single beam wherein said combiner is from a group of dichroic prism, PBS, optical fiber, free form lenses, DOE, HOE and planar light waveguide circuit and Total Internal Reflection (TIR) prism wherein the incident angle of said combined light beam onto said display device is larger than 10 degrees; and
   the LCOS comprises a cubic polarized beam splitter (PBS) that includes two triangular prisms having a layer of polarizer on a splitter face and a ¼ λ retarder parallel to the LCOS display surface and on the opposite side of face of said PBS from LCOS, so that a single PBS can transmit necessary image light to a projection lens.

2. The see-through display system of claim 1 wherein:
   the combiner further combines beams of the light sources with dichroic prisms into a light pipe includes a group of rectangular tube having higher refractive index than air and an optical fiber.

3. The see-through display system of claim 1 wherein:
   the combiner further combines beams of the light sources with a polarized beam splitter into a light pipe includes a group of rectangular tube having higher refractive index than air and an optical fiber.

4. The see-through display system of claim 1 further comprising:
   a group of light pipe, micro-lens-array and diffuser plate placed between the combiner and display device.

5. The display system of claim 1 wherein:
   the combiner comprising optical elements include a group of Diffractive Optical Element (DOE) and Holographic Optical Element (HOE) to direct light beams from said light sources into a light guide from a group of light pipe, optical fiber and diffuser plate.

6. An illuminator for a wearable display comprising:

a display device of LCOS;

a circuit to drive said display device;

an eyeglass lens and a temple;

an illuminator comprising a light source of multiple colors having light emitting device(s) from a group of Laser, LED and OLED;

a micro-lens-array to condense light beams containing multiple wavelengths;

an optical combiner combining the light sources of multiple colors into a single beam wherein said combiner comprises a polarized beam splitter (PBS) wherein the incident angle of said combined light beam onto said display device is larger than 20 degrees; and the PBS is a cross prism having a first polarizer passing P-wave and reflecting S-wave in a diagonal internal surface and a second polarizer passing S-wave and reflecting P-wave in another diagonal internal surface perpendicular to the first polarizer.

7. The illuminator of claim 6 wherein:

the micro-lens-array is an array of DOE from a group of holographic optical element and diffractive optical element.

8. The illuminator of claim 6 wherein:

the micro-lens-array is an array of free-form lenses.

\* \* \* \* \*